(12) United States Patent
Li (10) Patent No.: US 12,449,750 B2
(45) Date of Patent: Oct. 21, 2025

(54) DUPLEX DOCUMENT COPYING SYSTEM AND METHOD THEREOF

(71) Applicant: AVISION INC., Hsinchu (TW)

(72) Inventor: Chen-Chang Li, Hsinchu (TW)

(73) Assignee: AVISION INC., Hsinchu (TW)

( * ) Notice: Subject to any disclaimer, the term of this patent is extended or adjusted under 35 U.S.C. 154(b) by 133 days.

(21) Appl. No.: 18/527,421

(22) Filed: Dec. 4, 2023

(65) Prior Publication Data

US 2024/0184236 A1   Jun. 6, 2024

(30) Foreign Application Priority Data

Dec. 5, 2022   (TW) .................................. 111146614

(51) Int. Cl.
 *H04N 1/04* (2006.01)
 *G03G 15/00* (2006.01)
 *G03G 15/23* (2006.01)

(52) U.S. Cl.
 CPC ............ *G03G 15/23* (2013.01); *G03G 15/60* (2013.01); *H04N 1/04* (2013.01); *G03G 2215/00586* (2013.01)

(58) Field of Classification Search
 USPC .................. 358/505, 497, 474; 399/211, 212
 See application file for complete search history.

(56) References Cited

U.S. PATENT DOCUMENTS

| 2007/0040014 A1* | 2/2007 | Zhao | .................... G06Q 20/108 |
| | | | 235/379 |
| 2019/0132471 A1* | 5/2019 | Fujita | ................. H04N 1/00331 |

FOREIGN PATENT DOCUMENTS

| JP | 09247380 A | * | 9/1997 | |
| JP | 2015216637 A | * | 12/2015 | ......... H04N 1/00689 |
| TW | 200641720 A | | 12/2006 | |
| TW | 200920094 A | | 5/2009 | |

* cited by examiner

*Primary Examiner* — Cheukfan Lee (57) ABSTRACT

Disclosed are a duplex document copying system and a method thereof applied to a manual operation for a document. A scanning device is connected to a processing device. The processing device stores one or more block pixel thresholds. After the scanning device obtains first scanning data and second scanning data from scanning the document, the processing device compares pixel difference information between the first scanning data and the second scanning data with the one or more block pixel thresholds to calculate a similarity between the first scanning data and the second scanning data so as to avoid repeated scans. In this way, it avoids the manual errors and outputting the repeatedly scanned document, thereby improving overall work efficiency and saving resources.

16 Claims, 9 Drawing Sheets

DUPLEX DOCUMENT COPYING SYSTEM AND METHOD THEREOF

CROSS REFERENCE TO RELATED PRESENT DISCLOSURE

This application claims the priority benefit of Taiwan Patent Application Serial Number 111146614, filed on Dec. 5, 2022, the full disclosure of which is incorporated herein by reference.

BACKGROUND

Technical Field

The present disclosure relates to a copying system, in particular to a duplex document copying system and a method thereof.

Related Art

The existing duplex copying system mainly provides a document processing device. The document processing device comprises a scanner. When a user wants to copy a duplex document, the duplex document must be placed on the scanner, and the scanner scans a first side of the duplex document to obtain first scanning data. Then, the user must manually flip the duplex document to make the scanner scan a second side of the duplex document to obtain second scanning data, so that an output document with the first scanning data and the second scanning data can be output.

However, in the method for performing duplex copying using manual flipping in the prior art, if the user wants to copy many duplex documents or the external messages disturbs the user to make the user forget whether to flip the duplex document during the duplex copying process, the first scanning data and the second scanning data obtained by the scanner may have the same content. At this time, if the document processing device outputs or prints an output document due to the unawareness of the user, the duplicate contents are copied to the output document, causing the user to use the scanner to rescan the duplex document and consume new sheet for output. As a result, the overall work efficiency is reduced and resources are consumed, and even further waste of copy ink is caused.

Therefore, there is indeed a need to further provide improvements to existing technologies.

SUMMARY

In view of the above-mentioned deficiencies in the prior art, the main purpose of the present disclosure is to provide a duplex document copying system, which uses block pixel comparisons to avoid repeated scanning, improve overall work efficiency and save resources.

To achieve the above purpose, the present disclosure discloses a duplex document copying system applied to a manual operation for a document. The duplex document copying system includes a scanning device configured to obtain first scanning data and second scanning data from scanning the document; and a processing device connected to the scanning device and configured to store one or more block pixel thresholds, wherein the processing device compares pixel difference information between the first scanning data and the second scanning data with the one or more block pixel thresholds to calculate a similarity between the first scanning data and the second scanning data to avoid repeated scans.

Through the above structure, the processing device compares the pixel difference information and the one or more block pixel thresholds, and calculates the similarity between the first scanning data and the second scanning data to determine whether the first scanning data has been rescanned, to avoid manual errors and outputting the repeatedly scanned document, thereby achieving the purpose of improving overall work efficiency and saving resources.

To achieve the above purpose, the present disclosure further discloses a duplex document copying method applied to a manual operation for a document, wherein a duplex document copying system comprises a scanning device and a processing device, the scanning device obtains first scanning data and second scanning data from scanning the document, the processing device stores one or more block pixel thresholds, and the duplex document copying method executed by the processing device comprises the following steps: comparing pixel difference information between the first scanning data and the second scanning data with the one or more block pixel thresholds to determine a similarity between the first scanning data and the second scanning data to avoid repeated scans.

Through the above method, the processing device compares the pixel difference information and the one or more block pixel thresholds, and calculates the similarity between the first scanning data and the second scanning data to determine whether the first scanning data has been rescanned, to avoid manual errors and outputting the repeatedly scanned document, thereby achieving the purpose of improving overall work efficiency and saving resources.

BRIEF DESCRIPTION OF THE DRAWINGS

Accompanying drawings described herein are intended to provide a further understanding of the present disclosure and form a part of the present disclosure, and exemplary embodiments of the present disclosure and descriptions thereof are intended to explain the present disclosure but are not intended to unduly limit the present disclosure. In the drawings.

DETAILED DESCRIPTION OF THE EMBODIMENTS

The embodiments of the present disclosure will be described below in conjunction with the relevant drawings. In the FIGS., the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as "directly connected" or "directly coupled" to another element, there is no intervening element therebetween.

Figure 1:
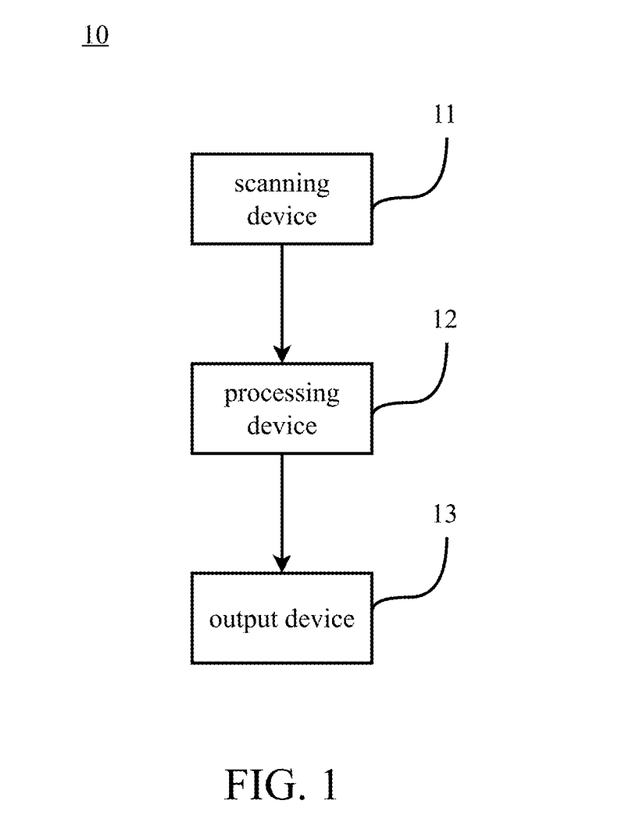
FIG. 1 is a block diagram of a duplex document copying system according to an embodiment of the present disclosure.

Regarding the embodiment of a duplex document copying system 10 of the present disclosure, as shown in FIG. 1, the duplex document copying system 10 comprises a scanning device 11 and a processing device 12. The scanning device 11 is connected to the processing device 12. The processing device 12 pre-stores one or more block pixel thresholds. After the scanning device 11 obtains first scanning data and second scanning data from scanning the document, the first scanning data and the second scanning data are sent to the processing device 12, so that the processing device 12 calculates a similarity between the first scanning data and the second scanning data according to the first scanning data and the second scanning data to avoid repeated scanning. In this embodiment, the duplex document copying system 10 comprises a multi-function printer, and the scanning device 11 comprises a scanner.

Specifically, after the user places the document with duplex data on the scanning device 11, the scanning device 11 scans a first side of the document to obtain the first scanning data. Then, the scanning device 11 sends the first scanning data to the processing device 12. The processing device 12 notifies the user that a first scanning process has been completed and informs the user that it can continue to scan a second side of the document. Since the document has duplex data, the user places a second side of the document on the scanning device 11 to make the scanning device 11 perform a in second scanning process to obtain the second scanning data. The scanning device 11 sends the second scanning data to the processing device 12. Then, the processing device 12 compares pixel difference information between the first scanning data and the second scanning data with the one or more block pixel thresholds to calculate a similarity between the first scanning data and the second scanning data to confirm whether there are repeated scans.

In this embodiment, the duplex document copying system 10 further comprises an output device 13. The output device 13 is connected to the processing device 12. When the processing device 12 confirms that the document has not been repeatedly scanned, the output device 13 outputs a copy document according to the document.

In this embodiment, the processing device 12 executes a pixel similarity algorithm on the first scanning data and the second scanning data to obtain the pixel difference information, and compares the calculated pixel difference information and the one or more block pixel thresholds to confirm whether there are repeated scans. In this embodiment, executing the pixel similarity algorithm comprises: performing a normalization process on the first scanning data and the second scanning data respectively to make a grayscale image matrix value of the first scanning data and a grayscale image matrix value of the second scanning data have the same size; performing a calculation on the grayscale image matrix value of the first scanning data and the grayscale image matrix value of the second scanning data respectively to correspondingly obtain a first pixel grayscale average value of the first scanning data and a second pixel grayscale average value of the second scanning data; comparing the first pixel grayscale average value and the first scanning data on which the normalization process has been performed to obtain a first pixel hash value, and comparing the second pixel grayscale average value and the second scanning data on which the normalization process has been performed to obtain a second pixel hash value; and comparing the first pixel hash value and the second pixel hash value to generate the pixel difference information. In this embodiment, the pixel similarity algorithm may be used for image similarity recognition, such as an image hash algorithm.

Figure 2:
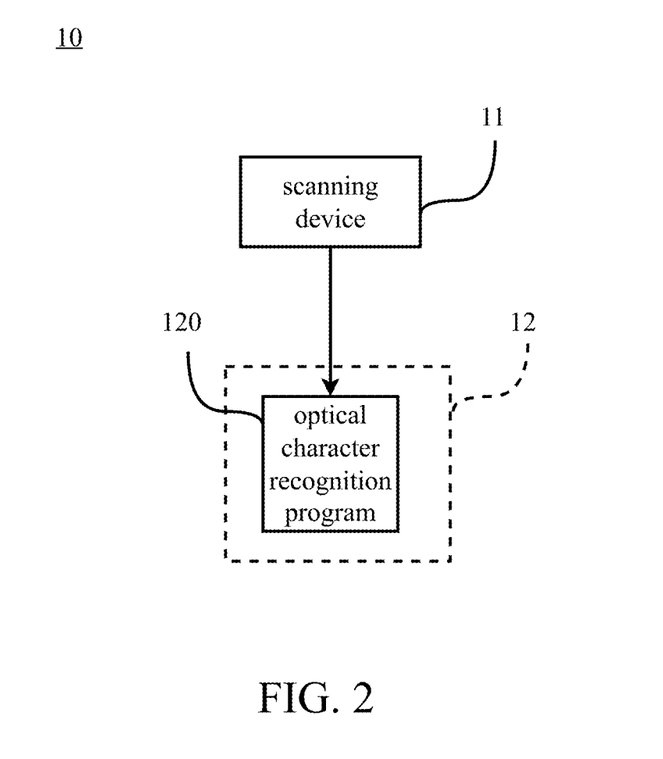
FIG. 2 is a block diagram of a duplex document copying system according to another embodiment of the present disclosure.

In this embodiment, as shown in FIG. 2, the processing device 12 further comprises an optical character recognition (OCR) program 120, which can be used to improve the accuracy of calculating the similarity between the first scanning data and the second scanning data in this embodiment. The optical character recognition program 120 of the processing device 12 is used to receive the image data from the scanning device 11. When the scanning device 11 scans the document to obtain the first scanning data and the second scanning data, the processing device 12 performs an optical character recognition conversion process on the first scanning data and the second scanning data respectively through the optical character recognition program 120, to obtain first pixel information of the first scanning data and second pixel information of the second scanning data respectively. Through the optical character recognition conversion process, the overall characteristic pixel information of each scanning data, such as the distribution positions of graphic pixels and text pixels, and the statistical information of their corresponding pixel values, can be more accurately calculated.

In this embodiment, the first pixel information comprises a coordinate of each graphic pixel and a coordinate of each text pixel in the first scanning data, and the second pixel information comprises a coordinate of each graphic pixel and a coordinate of each text pixel in the second scanning data. The coordinate positions and the pixel values of the graphic pixels and the text pixels can be used for comparisons of the similarity of more complex scanning data.

In order to further explain in this embodiment how to use the coordinate positions of the first pixel information and the second pixel information to cooperate with the aforementioned multiple block pixel thresholds to improve the effect and efficiency of comparison similarity, the processing device 12 can further obtain one or more first designated blocks corresponding to the coordinates of the graphic pixels and the text pixels of the first pixel information according to the first pixel information of the first scanning data, the processing device 12 can further obtain one or more second designated blocks corresponding to the coordinates of the graphic pixels and the text pixels of the second pixel information according to the second pixel information of the second scanning data, and the processing device 12 compares the pixel values of the first designated blocks and the pixel values of the second designated blocks to obtain one or more difference value, and performs statistics based on the one or more difference value and the one or more block pixel thresholds corresponding thereto to improve the accuracy of similarity comparison. In this embodiment, the first designated block and the second designated block are at the same corresponding position. In this embodiment, by comparing designated blocks, the accuracy of the comparison of determining whether the first scanning data has been repeatedly scanned is greatly improved.

Figure 3:
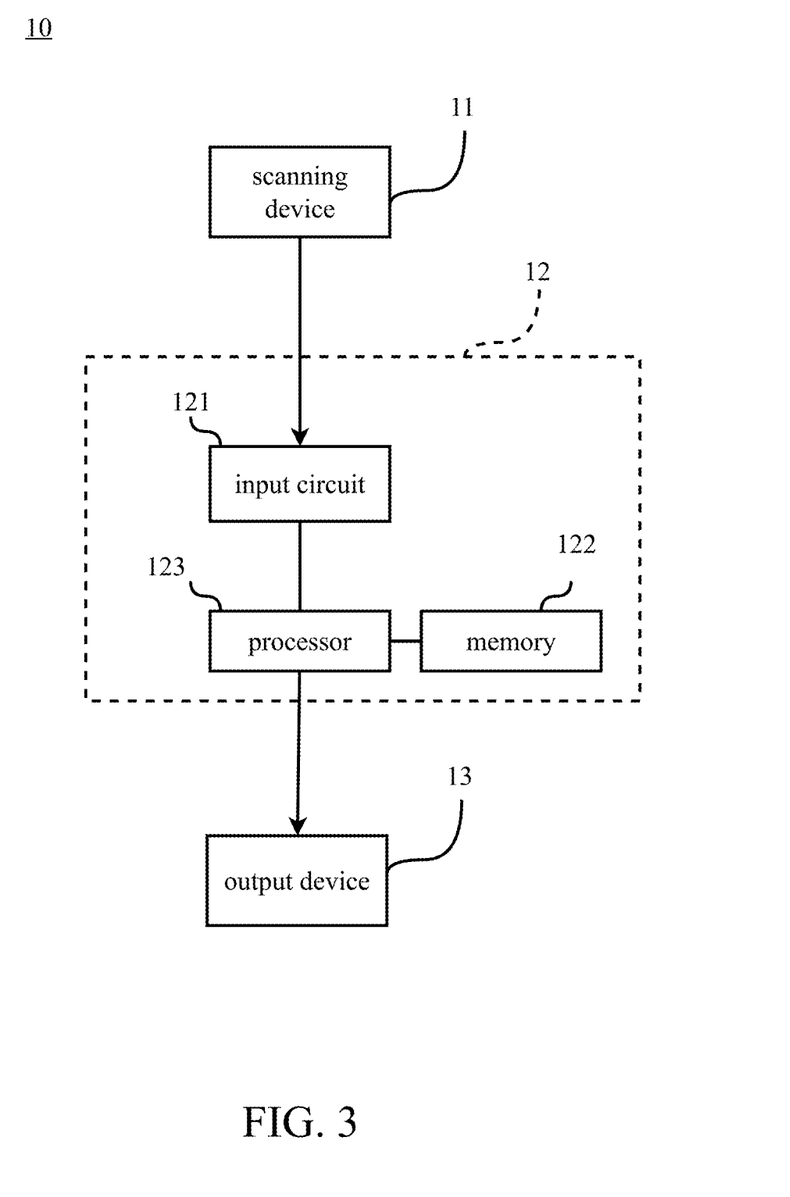
FIG. 3 is a block diagram of a duplex document copying system according to still another embodiment of the present disclosure.

Specifically, as shown in FIG. 3, the processing device 12 further comprises an input circuit 121, a memory 122 and a processor 123. The processor 123 is connected to the input circuit 121 and the memory 122 respectively. The input circuit 121 is connected to the scanning device 11 to receive the first scanning data and the second scanning data. The memory 122 can set or pre-store the one or more block pixel thresholds, and temporarily store the first scanning data and the second scanning data. In this embodiment, the processor 123 executes the optical character recognition (OCR) program 120 to perform an optical character recognition conversion process on the first scanning data and the second scanning data respectively.

In this embodiment, the scanning device 11 has a duplex document scanning function. After the processing device 12 obtains the first scanning data and the second scanning data in real time, the processing device 12 may temporarily store the scanning data simultaneously or successively in the memory 122. After the processor 123 confirms that two scans have been completed, the processor 123 receives the first scanning data and the second scanning data from the memory 122 simultaneously or successively. Then, after the processor 123 performs the optical character recognition conversion process on the first scanning data and the second scanning data to obtain the first pixel information and the second pixel information, the processor 123 executes the pixel similarity algorithm according to the first pixel information and the second pixel information, so that the processor 123 obtains the pixel difference information between the first pixel information and the second pixel information according to the first pixel information and the second pixel information. In this embodiment, the pixel similarity algorithm comprises: comparing the first pixel information and the second pixel information to obtain the pixel difference information between the first pixel information and the second pixel information. Specifically, the processor 123 performs difference calculations based on the first pixel information and the second pixel information to obtain the pixel difference information. By comparisons in blocks, the efficiency of determining whether the first scanning data has been repeatedly scanned can be greatly improved.

In this embodiment, the processor 123 compares the pixel difference information with the one or more block pixel thresholds. When the pixel difference information is less than the one or more block pixel thresholds, it is determined that the first scanning data and the second scanning data are similar. When the pixel difference information is greater than the one or more block pixel thresholds, it is determined that the first scanning data and the second scanning data are not similar.

Figure 4A:
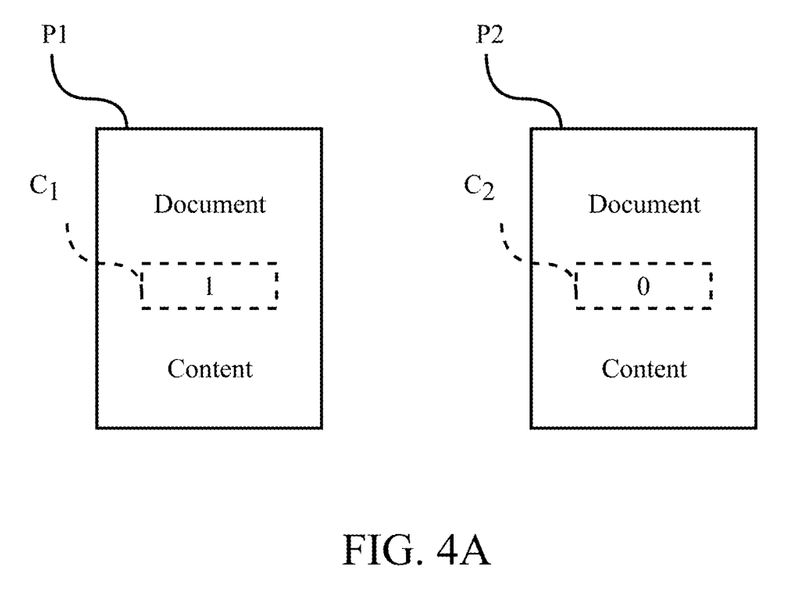
FIG. 4A is a block diagram of a duplex document copying system according to yet another embodiment of the present disclosure.
Figure 4B:
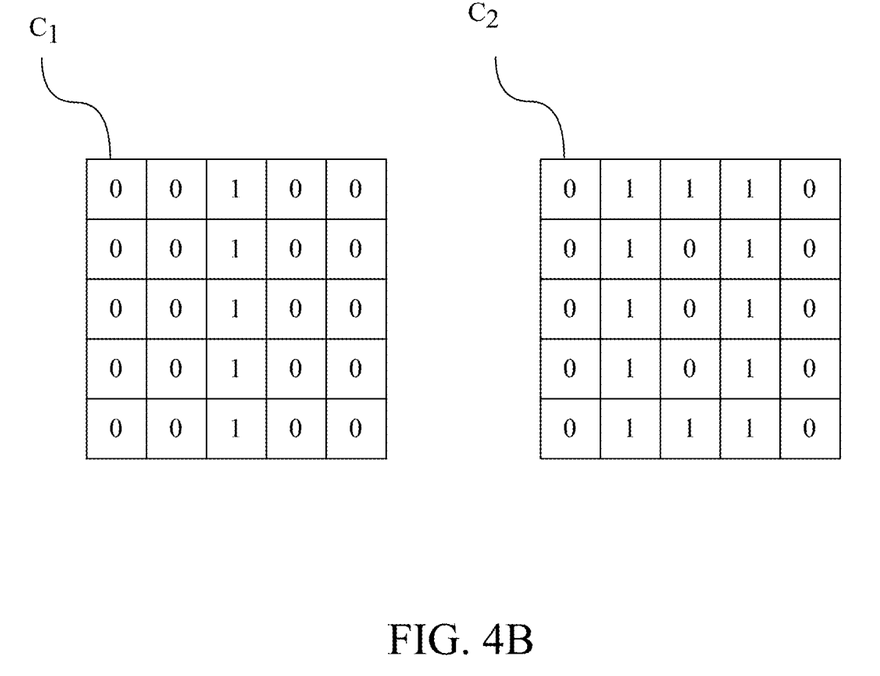
FIG. 4B is a matrix of a first pixel grayscale average value and a matrix of a second pixel grayscale average value according to the present disclosure.

For example, as shown in FIG. 4A and FIG. 4B, the processor 123 receives the first scanning data P1 and the second scanning data P2, and then performing the normalization process on the first scanning data P1 and the second scanning data P2 respectively to make the first scanning data P1 and the second scanning data P2 have the same size (e.g., 8×8 pixels in size), and performs grayscale conversion on the first scanning data P1 and the second scanning data P2 having the same size, to generate the grayscale image matrix value of the first scanning data P1 and the grayscale image matrix value of the second scanning data P2. Next, the processor 123 performs a calculation on the grayscale image matrix value of the first scanning data P1 (i.e., the first pixel information) and the grayscale image matrix value of the second scanning data P2 (i.e., the second pixel information) respectively to correspondingly obtain the first pixel grayscale average value and the second pixel grayscale average value. The processor 123 compares the matrix values in the grayscale image matrix value of the first scanning data P1 and the first pixel grayscale average value in one-to-one correspondence to obtain the first pixel hash value (0010000100001000010000100) of the first designated block C1, and compares the matrix values in the grayscale image matrix value of the second scanning data P2 and the second pixel grayscale average value in one-to-one correspondence to obtain the second pixel hash value (0111001010010100101001110) of the second designated block C2. After that, the processor 123 performs calculations based on the first pixel hash value (0010000100001000010000100) and the second pixel hash value (0111001010010100101001110) to generate the pixel difference information (1010001100011000110001010), compares the pixel difference information with the one or more pixel thresholds to determine that the similarity between the first scanning data and the second scanning data is low, and then determines that the first scanning data P1 and the second scanning data P2 are not scanned repeatedly.

Figure 5:
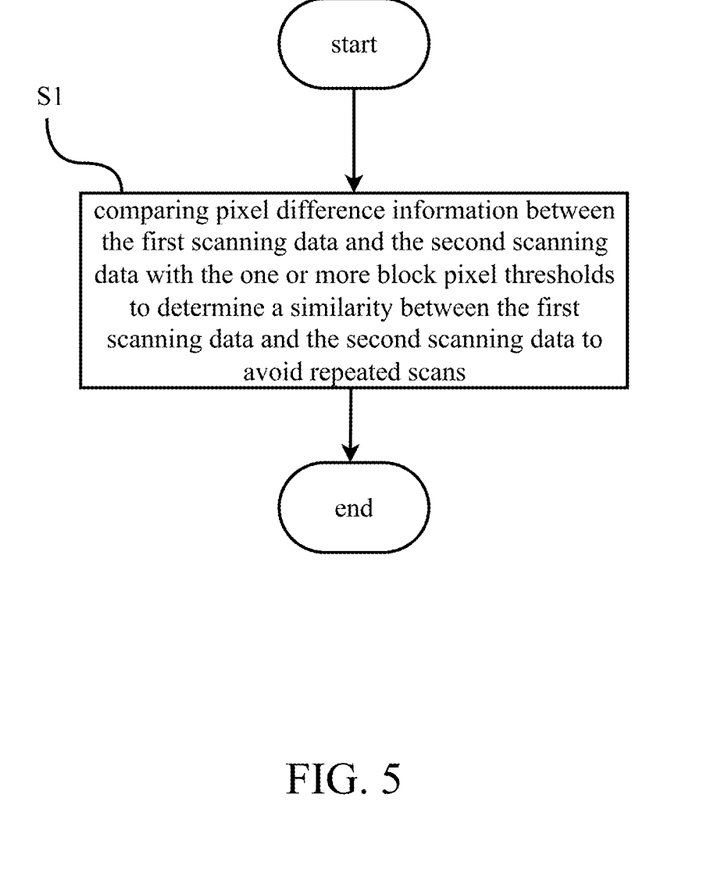
FIG. 5 is a flow chart of a duplex document copying method according to an embodiment of the present disclosure.

In addition, regarding another embodiment of a duplex document copying method of the present disclosure, as shown in FIG. 5, the duplex document copying method applied to a manual operation for a document, wherein the duplex document copying system 10 comprises a scanning device 11 and a processing device 12, the scanning device 11 obtains first scanning data and second scanning data from scanning the document, the processing device 12 stores one or more block pixel thresholds, and the duplex document copying method executed by the processing device 12 comprises the following steps: comparing pixel difference information between the first scanning data and the second scanning data with the one or more block pixel thresholds to determine a similarity between the first scanning data and the second scanning data to avoid repeated scans (S1).

Figure 6:
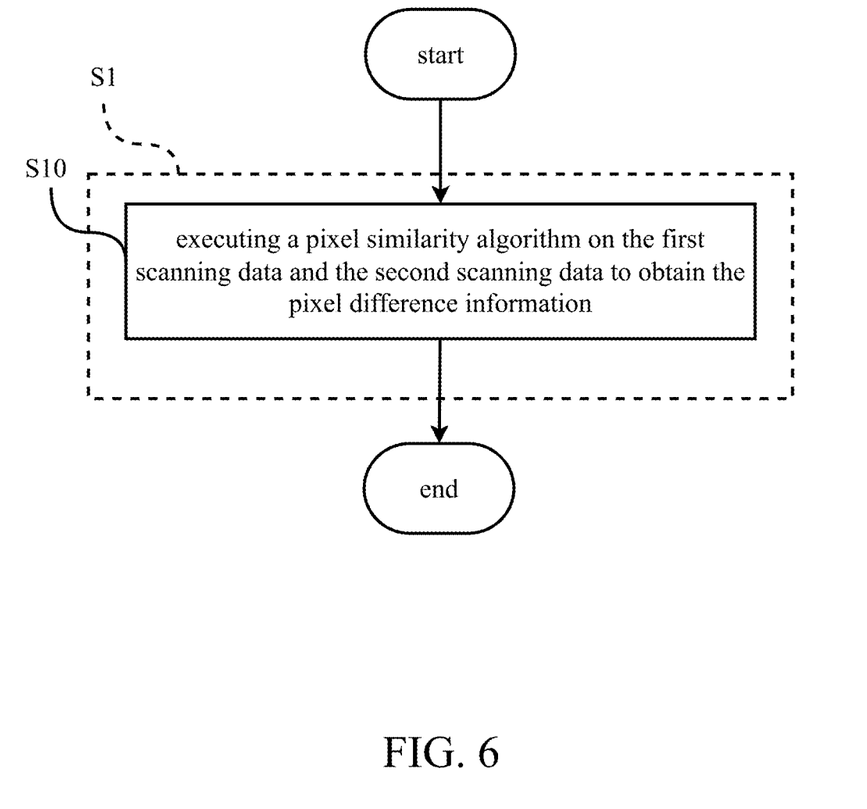
FIG. 6 is a flow chart of a duplex document copying method according to another embodiment of the present disclosure.

In this embodiment, as shown in FIG. 6, the step (S1) of comparing pixel difference information between the first scanning data and the second scanning data with the one or more block pixel thresholds to determine a similarity between the first scanning data and the second scanning data to avoid repeated scans comprises the following sub-step: executing a pixel similarity algorithm on the first scanning data and the second scanning data to obtain the pixel difference information (S10).

Figure 7:
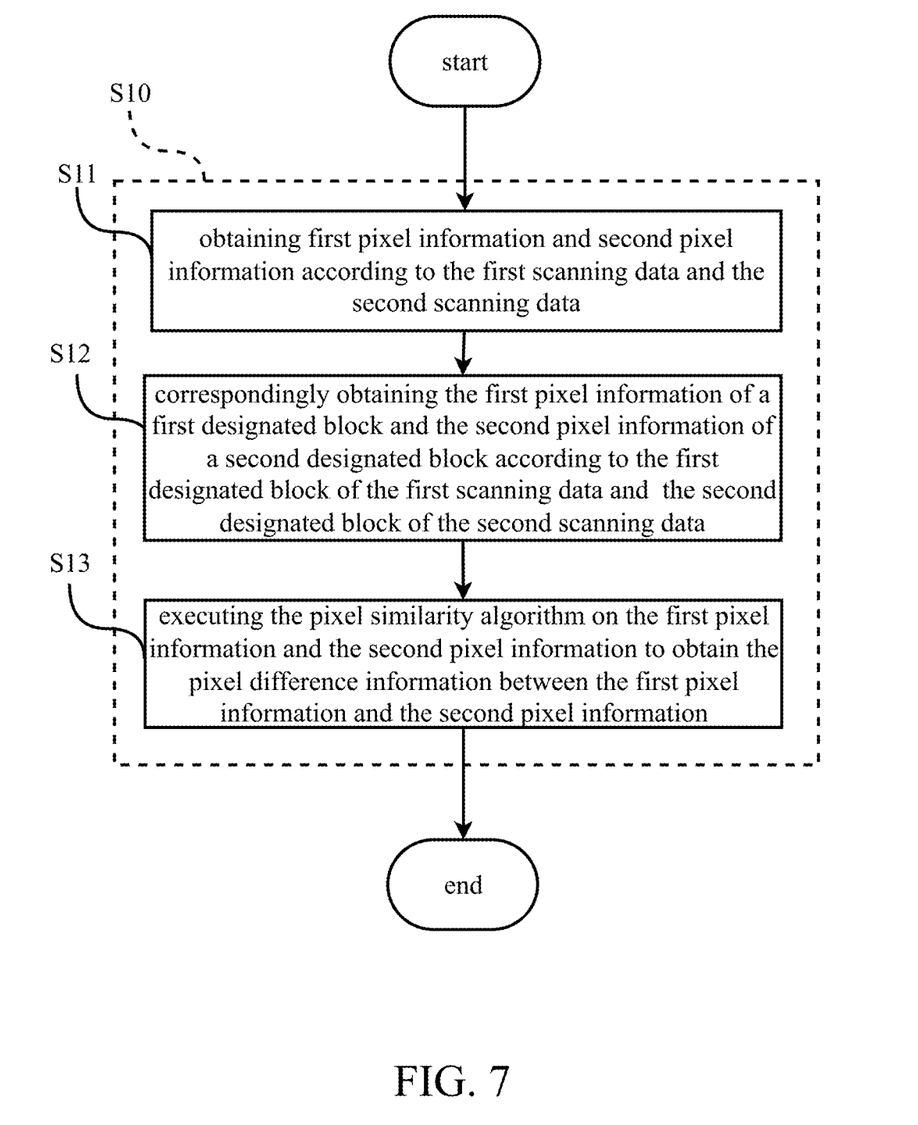
FIG. 7 is a flow chart of a duplex document copying method according to still another embodiment of the present disclosure.

In this embodiment, as shown in FIG. 7, the sub-step (S10) of executing the pixel similarity algorithm on the first scanning data and the second scanning data to obtain the pixel difference information comprises the following sub-steps: obtaining first pixel information and second pixel information according to the first scanning data and the second scanning data (S11); correspondingly obtaining the first pixel information of a first designated block and the second pixel information of a second designated block according to the first designated block of the first scanning data and the second designated block of the second scanning data (S12); and executing the pixel similarity algorithm on the first pixel information and the second pixel information to obtain the pixel difference information between the first pixel information and the second pixel information (S13).

Figure 8:
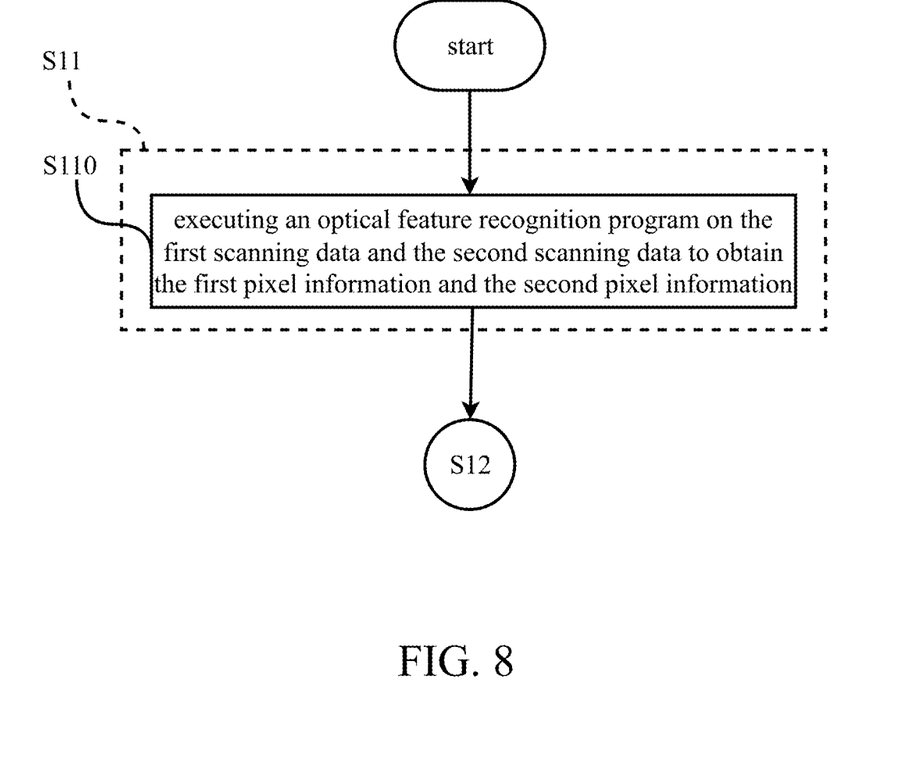
FIG. 8 is a flow chart of a duplex document copying method according to yet another embodiment of the present disclosure.

In this embodiment, as shown in FIG. 8, the sub-step (S11) of obtaining the first pixel information and the second pixel information according to the first scanning data and the second scanning data comprises the following sub-step: executing an optical feature recognition program on the first scanning data and the second scanning data to obtain the first pixel information and the second pixel information (S110).

Figure 9:
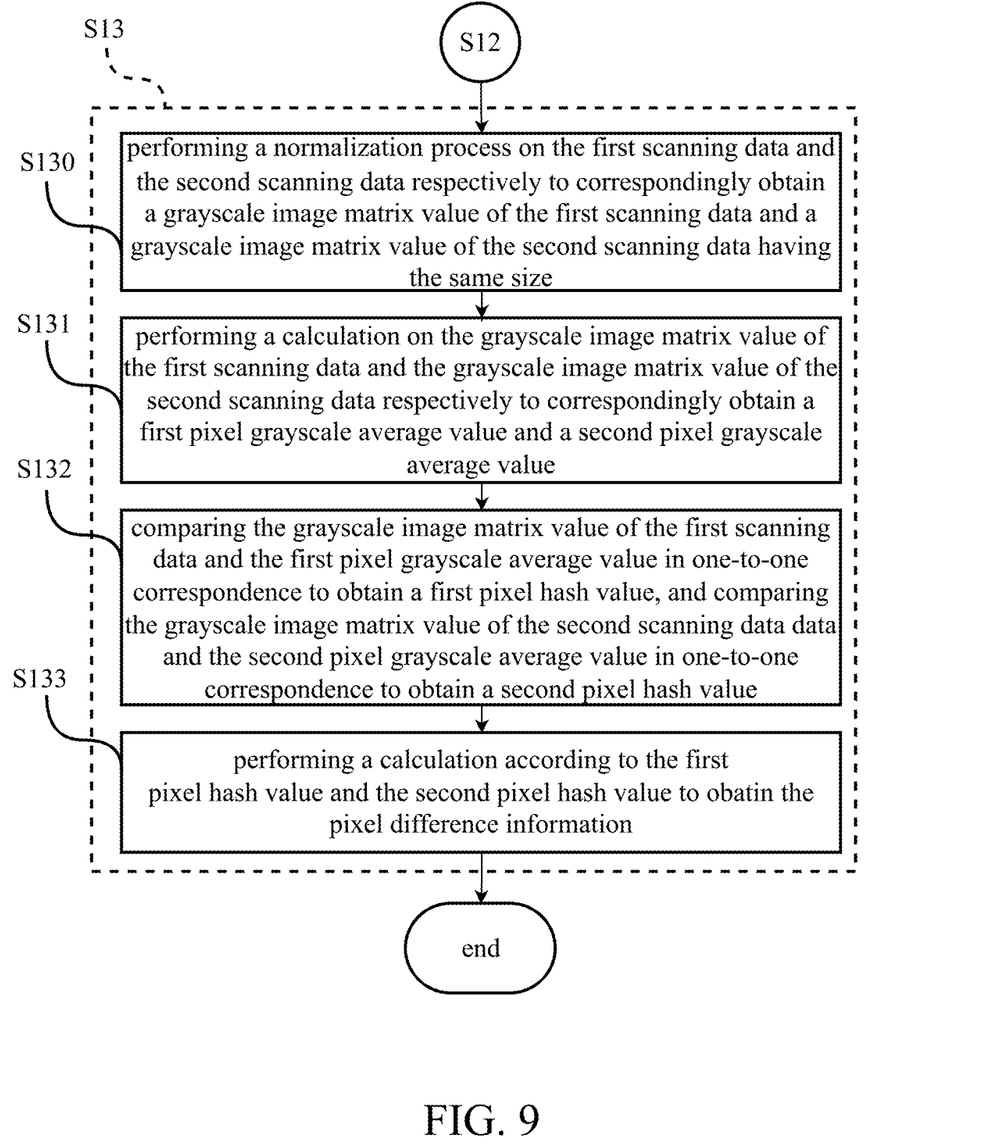
FIG. 9 is a flow chart of a duplex document copying method according to still yet another embodiment of the present disclosure.

In this embodiment, as shown in FIG. 9, the sub-steps (S13) of executing the pixel similarity algorithm on the first pixel information and the second pixel information to obtain the pixel difference information between the first pixel information and the second pixel information comprises the following sub-steps: performing a normalization process on the first scanning data and the second scanning data respectively to correspondingly obtain a grayscale image matrix value of the first scanning data and a grayscale image matrix value of the second scanning data having the same size (S130); performing a calculation on the grayscale image matrix value of the first scanning data and the grayscale image matrix value of the second scanning data respectively to correspondingly obtain a first pixel grayscale average value and a second pixel grayscale average value (S131); comparing the grayscale image matrix value of the first scanning data and the first pixel grayscale average value in one-to-one correspondence to obtain a first pixel hash value, and comparing the grayscale image matrix value of the second scanning data and the second pixel grayscale average value in one-to-one correspondence to obtain a second pixel hash value (S132); and performing a calculation according to the first pixel hash value and the second pixel hash value to obtain the pixel difference information (S133).

In summary, the processor 123 compares the pixel difference information with the one or more block pixel thresholds to determine whether the first scanning data has been repeatedly scanned. In this way, it can avoid repeated scanning caused by manual errors, and outputting the repeatedly scanned document, which reduces the overall work efficiency and wastes resources, to improve the overall work efficiency and save resources.

While the present disclosure is disclosed in the foregoing embodiments, it should be noted that these descriptions are not intended to limit the present disclosure. On the contrary, the present disclosure covers modifications and equivalent arrangements obvious to those skilled in the art. Therefore, the scope of the claims must be interpreted in the broadest manner to comprise all obvious modifications and equivalent arrangements.

What is claimed is:

1. A duplex document copying system applied to a manual operation for a document, comprising:
   a scanning device configured to obtain first scanning data and second scanning data from scanning the document; and
   a processing device connected to the scanning device and configured to store one or more block pixel thresholds;
   wherein the processing device compares pixel difference information between the first scanning data and the second scanning data with the one or more block pixel thresholds to determine a similarity between the first scanning data and the second scanning data to avoid repeated scans;
   wherein the processing device executes a pixel similarity algorithm on the first scanning data and the second scanning data to obtain the pixel difference information;
   wherein the processing device comprises:
   an input circuit configured to receive the first scanning data and the second scanning data;
   a memory configured to store the one or more block pixel thresholds and temporarily store the first scanning data and the second scanning data; and
   a processor connected to the input circuit and the memory, and configured to obtain first pixel information of a first designated block and second pixel information of a second designated block according to the first designated block of the first scanning data and the second designated block of the second scanning data, and obtain the pixel difference information between the first pixel information and the second pixel information according to the first pixel information and the second pixel information.

2. The duplex document copying system according to claim 1, wherein the processing device compares the pixel difference information with the one or more block pixel thresholds; when the pixel difference information is less than the one or more block pixel thresholds, it is determined that the first scanning data and the second scanning data are similar; when the pixel difference information is greater than the one or more block pixel thresholds, it is determined that the first scanning data and the second scanning data are not similar.

3. The duplex document copying system according to claim 1, wherein the processing device compares the pixel difference information with the one or more block pixel thresholds; when the pixel difference information is less than the one or more block pixel thresholds, it is determined that the first scanning data and the second scanning data are similar; when the pixel difference information is greater than the one or more block pixel thresholds, it is determined that the first scanning data and the second scanning data are not similar.

4. The duplex document copying system according to claim 1, wherein the processing device compares the pixel difference information with the one or more block pixel thresholds; when the pixel difference information is less than the one or more block pixel thresholds, it is determined that the first scanning data and the second scanning data are similar; when the pixel difference information is greater than the one or more block pixel thresholds, it is determined that the first scanning data and the second scanning data are not similar.

5. The duplex document copying system according to claim 1, wherein the processor executes an optical feature recognition program on the first scanning data and the second scanning data to obtain the first pixel information and the second pixel information.

6. The duplex document copying system according to claim 5, wherein the processing device compares the pixel difference information with the one or more block pixel thresholds; when the pixel difference information is less than the one or more block pixel thresholds, it is determined that the first scanning data and the second scanning data are similar; when the pixel difference information is greater than the one or more block pixel thresholds, it is determined that the first scanning data and the second scanning data are not similar.

7. The duplex document copying system according to claim 1, wherein the processor executes the pixel similarity algorithm to perform a normalization process on the first scanning data and the second scanning data respectively to correspondingly obtain a grayscale image matrix value of the first scanning data and a grayscale image matrix value of the second scanning data having the same size, and perform a calculation on the grayscale image matrix value of the first scanning data and the grayscale image matrix value of the second scanning data respectively to correspondingly obtain a first pixel grayscale average value and a second pixel grayscale average value, and compare the grayscale image matrix value of the first scanning data and the first pixel grayscale average value in one-to-one correspondence to obtain a first pixel hash value, and compare the grayscale image matrix value of the second scanning data and the second pixel grayscale average value in one-to-one correspondence to obtain a second pixel hash value, and perform a calculation according to the first pixel hash value and the second pixel hash value to obtain the pixel difference information.

8. The duplex document copying system according to claim 7, wherein the processing device compares the pixel difference information with the one or more block pixel thresholds; when the pixel difference information is less than the one or more block pixel thresholds, it is determined that the first scanning data and the second scanning data are similar; when the pixel difference information is greater than the one or more block pixel thresholds, it is determined that the first scanning data and the second scanning data are not similar.

9. A duplex document copying method applied to a manual operation for a document, wherein a duplex document copying system comprises a scanning device and a processing device, the scanning device obtains first scanning data and second scanning data from scanning the document, the processing device stores one or more block pixel thresholds, and the duplex document copying method executed by the processing device comprises the following steps:
comparing pixel difference information between the first scanning data and the second scanning data with the one or more block pixel thresholds to determine a similarity between the first scanning data and the second scanning data to avoid repeated scans;
wherein the step of comparing the pixel difference information between the first scanning data and the second scanning data with the one or more block pixel thresholds to determine the similarity between the first scanning data and the second scanning data to avoid repeated scans comprises the following sub-step:
executing a pixel similarity algorithm on the first scanning data and the second scanning data to obtain the pixel difference information;
wherein the sub-step of executing the pixel similarity algorithm on the first scanning data and the second scanning data to obtain the pixel difference information comprises the following sub-steps:
obtaining first pixel information and second pixel information according to the first scanning data and the second scanning data;
correspondingly obtaining the first pixel information of a first designated block and the second pixel information of a second designated block according to the first designated block of the first scanning data and the second designated block of the second scanning data; and
executing the pixel similarity algorithm on the first pixel information and the second pixel information to obtain the pixel difference information between the first pixel information and the second pixel information.

10. The duplex document copying method according to claim 9, wherein when the pixel difference information is less than the one or more block pixel thresholds, it is determined that the first scanning data and the second scanning data are similar; when the pixel difference information is greater than the one or more block pixel thresholds, it is determined that the first scanning data and the second scanning data are not similar.

11. The duplex document copying method according to claim 9, wherein when the pixel difference information is less than the one or more block pixel thresholds, it is determined that the first scanning data and the second scanning data are similar; when the pixel difference information is greater than the one or more block pixel thresholds, it is determined that the first scanning data and the second scanning data are not similar.

12. The duplex document copying method according to claim 9, wherein when the pixel difference information is less than the one or more block pixel thresholds, it is determined that the first scanning data and the second scanning data are similar; when the pixel difference information is greater than the one or more block pixel thresholds, it is determined that the first scanning data and the second scanning data are not similar.

13. The duplex document copying method according to claim 9, wherein the sub-step of obtaining the first pixel information and the second pixel information according to the first scanning data and the second scanning data comprises the following sub-step:
executing an optical feature recognition program on the first scanning data and the second scanning data to obtain the first pixel information and the second pixel information.

14. The duplex document copying method according to claim 13, wherein when the pixel difference information is less than the one or more block pixel thresholds, it is determined that the first scanning data and the second scanning data are similar; when the pixel difference information is greater than the one or more block pixel thresholds, it is determined that the first scanning data and the second scanning data are not similar.

15. The duplex document copying method according to claim 9, wherein the sub-step of executing the pixel similarity algorithm on the first pixel information and the second pixel information to obtain the pixel difference information between the first pixel information and the second pixel information comprises the following sub-steps:
performing a normalization process on the first scanning data and the second scanning data respectively to correspondingly obtain a grayscale image matrix value of the first scanning data and a grayscale image matrix value of the second scanning data having the same size;
performing a calculation on the grayscale image matrix value of the first scanning data and the grayscale image matrix value of the second scanning data respectively to correspondingly obtain a first pixel grayscale average value and a second pixel grayscale average value;
comparing the grayscale image matrix value of the first scanning data and the first pixel grayscale average value in one-to-one correspondence to obtain a first pixel hash value, and comparing the grayscale image matrix value of the second scanning data and the second pixel grayscale average value in one-to-one correspondence to obtain a second pixel hash value; and performing a calculation according to the first pixel hash value and the second pixel hash value to obtain the pixel difference information.

16. The duplex document copying method according to claim 15, wherein when the pixel difference information is less than the one or more block pixel thresholds, it is determined that the first scanning data and the second scanning data are similar; when the pixel difference information is greater than the one or more block pixel thresholds, it is determined that the first scanning data and the second scanning data are not similar.

\* \* \* \* \*